(12) United States Patent
Brunmair et al.

(10) Patent No.: US 6,599,992 B1
(45) Date of Patent: Jul. 29, 2003

(54) POWDER COATING COMPOSITION

(75) Inventors: Christoph Alfred Brunmair, Vienna (AT); Rudolf Leopold Kaiser, Vienna (AT)

(73) Assignee: Reichhold, Inc., Durham, NC (US)

( * ) Notice: Subject to any disclaimer, the term of this patent is extended or adjusted under 35 U.S.C. 154(b) by 0 days.

(21) Appl. No.: 09/572,555

(22) Filed: May 16, 2000

Related U.S. Application Data

(60) Provisional application No. 60/137,637, filed on Jun. 4, 1999.

(51) Int. Cl.$^7$ .............................................. C09D 167/02
(52) U.S. Cl. ....................... 525/438; 525/437; 525/440; 525/934; 427/195; 427/385.5; 427/386
(58) Field of Search ................................ 525/438, 440, 525/437, 934; 427/385.5, 195, 386

(56) References Cited

U.S. PATENT DOCUMENTS

| | | | |
|---|---|---|---|
| 3,839,253 A | 10/1974 | Kershaw et al. | 260/29.6 R |
| 3,842,035 A | 10/1974 | Klaren | 260/47 EN |
| 4,072,656 A | 2/1978 | Hartmann | 260/47 EN |
| 4,089,910 A | 5/1978 | Shibata et al. | 260/836 |
| 4,092,373 A | 5/1978 | Siwiec et al. | 260/830 R |
| 4,137,277 A | 1/1979 | Nordstrom et al. | 260/835 |
| 4,189,421 A | 2/1980 | Shay et al. | 260/38 |
| 4,242,253 A | 12/1980 | Yallourakis | 260/40 TN |
| 4,312,795 A | 1/1982 | Taguchi et al. | 260/18 R |
| 4,357,435 A | 11/1982 | Lewis et al. | 524/239 |
| 4,388,448 A | 6/1983 | Melby | 525/327.3 |
| 4,442,270 A | 4/1984 | Passmore et al. | 525/440 |
| 4,818,791 A | 4/1989 | Murakami et al. | 525/124 |
| 4,835,228 A | 5/1989 | Hefner, Jr. et al. | 525/524 |
| 4,861,841 A | 8/1989 | Marrion | 525/327.3 |
| 4,871,806 A | 10/1989 | Shalati et al. | 525/108 |
| 4,937,288 A | 6/1990 | Pettit, Jr. et al. | 525/176 |
| 5,008,335 A | 4/1991 | Pettit, Jr. | 525/111 |
| 5,093,391 A | 3/1992 | Barsotti et al. | 523/400 |
| 5,112,931 A | 5/1992 | Potter et al. | 528/45 |
| 5,124,176 A | 6/1992 | Marrion | 427/195 |
| 5,143,994 A | 9/1992 | Laas et al. | 528/45 |
| 5,206,295 A | 4/1993 | Harper et al. | 525/207 |
| 5,206,332 A | 4/1993 | Hammer et al. | 528/118 |
| 5,212,243 A | 5/1993 | Toyoda et al. | 525/187 |
| 5,326,821 A | 7/1994 | Sasaki et al. | 525/124 |
| 5,407,706 A | 4/1995 | Kano et al. | 427/386 |
| 5,407,707 A | 4/1995 | Simeone et al. | 427/410 |
| 5,436,311 A | 7/1995 | Hoebeke et al. | 525/174 |
| 5,470,912 A | 11/1995 | Loar | 525/58 |
| 5,491,202 A | 2/1996 | Umehara et al. | 525/438 |
| 5,543,464 A | 8/1996 | Decker et al. | 525/176 |
| 5,585,146 A | 12/1996 | Uenaka et al. | 427/407.1 |
| 5,593,730 A | 1/1997 | Satgurunathan et al. | 427/386 |
| 5,618,884 A | 4/1997 | Cai et al. | 525/117 |
| 5,621,064 A | 4/1997 | Laas et al. | 528/60 |
| 5,635,548 A | 6/1997 | Kittle et al. | 523/220 |
| 5,648,117 A | 7/1997 | Shiomi et al. | 427/195 |
| 5,747,166 A | 5/1998 | Schwarte et al. | 428/423.1 |
| 5,786,419 A | 7/1998 | Meier-Westhues et al. | 524/590 |
| 5,847,067 A | 12/1998 | Gras | 528/45 |
| 5,925,698 A * | 7/1999 | Steckel | 524/322 |

FOREIGN PATENT DOCUMENTS

| | | |
|---|---|---|
| EP | 0 744 421 A2 | 11/1996 |
| WO | WO 95/01407 | 1/1995 |

OTHER PUBLICATIONS

International Search Report, PCT/US00/13493, Sep. 12, 2000.

* cited by examiner

*Primary Examiner*—Patricia A. Short

(57) ABSTRACT

The present invention provides a powder coating composition. The powder coating composition includes a polyester resin having both hydroxyl and carboxyl groups, a curing agent for the carboxyl groups of the polyester resin, and an uretdione hardener which reacts with the hydroxyl groups.

16 Claims, No Drawings

POWDER COATING COMPOSITION

CROSS REFERENCE TO RELATED APPLICATION

This application claims priority to U.S. Provisional Application No. 60/137,637 filed Jun. 4, 1999, the disclosure of which is hereby incorporated herein by reference.

FIELD AND BACKGROUND OF THE INVENTION

This invention relates to a powder coating composition, and more particularly a powder coating composition that exhibits excellent external durability and excellent mechanical properties while having low or substantially zero VOC levels.

Powder coating compositions are now being used in a wide variety of painting techniques. They have become increasingly desirable, particularly in the automotive and truck industries, for various reasons including those related to ecology, health and safety. For example, powder coating compositions can potentially reduce the amount of volatile solvents used as compared to liquid paints. After curing, typically using heat, only a very small amount, if any, of volatile solvent is given off to the environment.

Various powder coating compositions have been suggested. For example, a powder coating composition with excellent exterior durability can be prepared by reacting an acid group-containing acrylic polymer and a curing agent, triglycidyl isocyanurate (TGIC). Such coating compositions, however, often have poor stability and physical properties. Moreover, there is a concern about the potential environment impact of the use of TGIC. It is also common to use blocked polyisocyanate crosslinking agents. For example, caprolactam-blocked isophoronediisocyanates and toluene 2,4-diisocyanate are described in U.S. Pat. No. 3,822,240 to Schmitt et al., U.S. Pat. No. 4,150,211 to Muller et al. and U.S. Pat. No. 4,212,962 to Schmitt et al.

U.S. Pat. No. 4,499,239 to Murakami et al. proposes a composition comprising 60 to 97 percent by weight of a linear polyester resin having an acid number of 15 to 200 mg KOH/g and 3 to 40 percent by weight of a glycidyl group-containing acrylic polymer, and optionally is modified with a monobasic acid such as methyl methacrylate. Powder coating compositions comprising a copolymer of glycidyl methacrylate, an ethylenically unsaturated compound, and a crosslinking agent formed in an anhydride of a dicarboxylic acid are proposed in U.S. Pat. Nos. 3,758,632, 3,781,379, 2,888,943 and 4,091,049 to Labana et al.

There, however, remains a need for a powder coating composition that has excellent resistance to degradation, and eliminates the need for potentially hazardous modifiers, curing agents (e.g., TGIC) or crosslinking agents (e.g., blocked polyisocyanates).

SUMMARY OF THE INVENTION

To this end, the present invention provides a powder coating composition. The powder coating composition comprises a polyester resin having both hydroxyl and carboxyl groups, a curing agent for the carboxyl groups of the polyester resin, and an uretdione hardener which reacts with the hydroxyl groups. The curing agent for the carboxyl groups is preferably a compound having active hydrogens, and for example is a beta-hydroxy(1)alkylamide. Alternatively, an aromatic compound containing glycidyl groups can be used, and for example, is a di or triglycidyl ester of terephthalic or trimellitic acid or mixtures of both.

DETAILED DESCRIPTION OF THE INVENTION

As detailed above, the powder coating composition of the present invention comprises a polyester resin having both hydroxyl and carboxyl groups, a curing agent for the carboxyl groups of the polyester resin, and an uretdione hardener which reacts with the hydroxyl groups.

The polyester resin includes carboxyl and hydroxyl functionality, i.e., it is a "bi-functional" polyester. With respect to the carboxyl portion, the starting acid and alcohol components thereof may be known conventional dibasic and polybasic acids, and dihydric and polyhydric alcohols, respectively. Typical examples of the acid component include terephthalic acid, isophthalic acid, phthalic acid, methylterephthalic acid, trimellitic acid, pyromellitic acid, adipic acid, sebacic acid, succinic acid, maleic acid, fumaric acid, tetrahydrophthalic acid, methyltetrahydrophthalic acid, hexahydrophthalic acid, methylhexahydrophthalic acid, and the anhydrides thereof. Typical examples of the alcohol component include ethylene glycol, propylene glycol, 1,3-butanediol, 1,4-butanediol, 1,6-hexanediol, neopentyl glycol, isopentyl glycol, bishydroxyethyl terephthalate, hydrogenated bisphenol A, an ethylene oxide adduct of hydrogenated bisphenol A, a propylene oxide adduct of hydrogenated bisphenol A, trimethylolethane, trimethylolpropane, glycerol, pentaerythritol and 2,2,4-trimethylpentane-1,3-diol. Monoepoxy compounds can also be used as one glycol component. The amount of polyester, by weight is preferably from about 70 to 97 percent, and more preferably is 80 to 95 percent by weight of the powder coating composition. The polyester resin preferably has a hydroxyl value of about 5 to 100 mg KOH/g, more preferably 7 to 40 mg KOH/g, and an acid value preferably of about 5 to 100 mg KOH/g, and more preferably 7 to 40 mg KOH/g.

With respect to the hydroxyl portion, the above alcohol components may be used, namely ethylene glycol, propylene glycol, 1,3-butanediol, 1,4-butanediol, 1,6-hexanediol, neopentyl glycol, isopentyl glycol, bishydroxyethyl terephthalate, hydrogenated bisphenol A, an ethylene oxide adduct of hydrogenated bisphenol A, a propylene oxide adduct of hydrogenated bisphenol A, trimethylolethane, trimethylolpropane, glycerol, pentaerythritol and 2,2,4-trimethylpentane-1,3-diol.

The curing agent for the carboxyl groups is preferably a compound having active hydrogens. Exemplary compounds having active hydrogens are the beta-hydroxyalkylamides. They provide a crosslinked polymer network which is hard, durable, corrosion resistant and solvent resistant. It is believed the beta-hydroxyalkylamides cure the coating (i.e., is the curing agent for the carboxyl group) through an esterification reaction with the carboxy-containing compounds forming multiple ester crosslinks. The hydroxyl functionality of the hydroxyalkylamide should be on an average basis of at least 2, preferably greater than 2, and more preferably from greater than 2, up to and including 4, in order to obtain an optimum curing. The beta-hydroxyalkylamide curing agents are described in U.S. Pat. No. 4,937,288 to Pettit et al. the disclosure of which is incorporated herein by reference in its entirety. The amount of beta-hydroxyalkylamide curing agent by weight is preferably about 0.5 to 10 percent, and more preferably is 1 to 7 percent by weight of the total powder coating composition.

The beta-hydroxyalkylamides can be prepared, for example, by reacting a lower alkyl ester or mixture of esters of carboxylic acids with a beta-hydroxyalkylamine at a temperature ranging from ambient temperature up to about 200° C. depending on the choice of reactants and the presence or absence of catalyst. Suitable catalysts are basic catalysts including e.g., sodium methoxide, potassium methoxide, sodium butoxide, potassium butoxide, sodium hydroxide, and potassium hydroxide present preferably in amounts of about 0.1 to about 1 percent by weight based on weight of alkyl ester. A particularly suitable commercially available β-hydroxyalkylamide is Primid XL-552 or Primid QM-1260 available from EMS-Primid, Switzerland.

Alternatively the curing agent for the carboxyl groups can be an aromatic compound containing glycidyl groups. Exemplary compounds include di or triglycidyl esters of terephthalic or trimellitic acid or mixtures of both. A specific example is Araldite PT 910 available from Ciba Specialty Chemicals Inc., Switzerland.

The uretdione hardener reacts with the hydroxyl groups. Suitable uretdione hardeners are self-blocked uretdione groups containing polyisocyanates. These uretdione group-containing organic polyisocyanates can be prepared in accordance with well-known methods by dimerization of the corresponding organic polyisocyanate. See Saunders, J. H. and Frisch, K. C., *Polyurethane: Chemistry and Technology, Part I*, pages 91–94 (1962) and U.S. Pat. No. 4,522,975 to O'Connor the disclosure of which is incorporated by reference herein in its entirety. Any suitable organic polyisocyanate, or mixture of polyisocyanates, which is susceptible to dimerization can be used. Typical examples include the following and mixtures thereof: 2,4-toluene diisocyanate; 2,6-toluene diisocyanate; isomeric mixtures of 2,4- and 2,6-toluene diisocyanate; ethylene diisocyanate; propylene diisocyanate; methylene-bis (4-phenyl isocyanate); methylene-bis (4-cyclohexyl)isocyanate; xylene diisocyanate; 3,3'-bitoluene-4-4'-diisocyanate; hexamethylene diisocyanate; naphthalene 1,5-diisocyanate; isophorone diisocyanate; and the like. Exemplary uretdione hardeners include Vestagon available from Huils, Germany or Crelan available from Bayer, Germany. The amount of uretdione hardener is preferably from about 1 to 20 percent, and more preferably 3 to 15 percent by weight of the total powder coating composition.

The composition of the present invention avoids the use of blocking agents, i.e., blocked polyisocyanates, and particularly blocked polyisocyanates that use potentially hazardous blocking agents such as caprolactams, thus substantially reducing the level of VOCs to zero or substantially zero.

A flow control agent may be included in an amount preferably of from about 0 to 4 percent by weight percent of the total powder composition. In general, the flow control agent should be a polymer preferably having a number average molecular weight of at least 1000 and a glass transition temperature at least 50° C. below the glass transition temperature of the compound copolymer. This flow control agent may be an acrylic polymer which may be prepared by polymerization of acrylate and methacrylate monomers in bulk or in suitable solvents using well known free radical initiators. The amount of initiator and polymerization conditions are chosen so that the polymer preferably has a molecular weight ($M_n$) above 1000, more preferably about 5000 and most preferably between about 6000 and about 20,000. Among the preferred acrylic polymers useful as flow control agents are polylauryl acrylate, polybutyl acrylate, poly (2-ethylhexyl acrylate), polylauryl methacrylate and polyisodecyl methacrylate.

Other flow control agents can be included and preferably have (at the baking temperature of the powder), lower than that of the copolymer used in the mixture. Another flow control agent is a fluorinated polymer such as esters of polyethyleneglycol or polypropylene glycol and fluorinated fatty acids. For example, an ester of polyethyleneglycol of molecular weight of over 2500 and perfluoro octanoic acid is a useful flow control agent. Polymeric siloxanes of molecular weight ($M_n$) over 1,000 advantageously 1,000 to 20,000, may also be useful as flow control agents, e.g., alkyl substituted siloxanes such as polydimethyl siloxanes, and halogenated siloxanes such as poly 3,3,3-trifluoropropylmethyl siloxanes, poly(perfluorodimethyl siloxane, poly(pentafluorophenyl methyl siloxane, etc.

Since the powder coating compositions of the invention may be applied to articles by electrostatic spray techniques, the composition may include a small weight percent of an antistatic agent. In particular, the antistatic agent is included in a range preferably of from about 0.05 percent to 1.0 percent by weight of the total powder composition. Suitable antistatic agents include, but are not limited to tetraalkyl ammonium salts as discussed previously and which also serve as catalysts. Other suitable antistatic agents include: alkyl poly (ethyleneoxy) phosphate or alkyllauryl poly (ethyleneoxy) phosphates such as ethyl benzyl poly ethyleneoxy) phosphate, polyethyleneimine, poly (2-vinyl pyrolidone), pyridinium chloride, poly (vinyl pyridinium chloride), polyvinyl alcohol, and inorganic salts.

A plasticizer may be used in the powder coating compositions of this invention if desired. The types of plasticizers used very often include adipates, phosphates, phthalates, sebacates, polyesters derived from adipic acid or azelaic acid, and epoxy or epoxidized plasticizers. Exemplary of the many plasticizers which may be employed are: dihexyl adipate, diisooctyl adipate, dicyclohexyl adipate, triphenyl phosphate, tricresyl phosphate, tributyl phosphate, dibutylphthalate, dioctylphthalate, butyl octyl phthalate, dioctyl sebacate, butyl benzyl sebacate, dibenzyl sebacate, butanediol-1,4diglycidyl ether and cellulose acetate butyrate.

A degassing agent may be used such as benzoin.

Fillers may be included such as talc, mica, kaolin, chalk, ground quartz, ground slate, aluminum trihydrate and the like. Pigments may be included in an amount of from 0.1 to 50 percent by weight. Suitable pigments include titanium dioxide, iron oxides, organic dyestuffs carbon black, etc. Metallic pigments such as aluminum may be included to provide a metallic appearance.

The powder coating composition may be applied by known coating methods such as electrostatic coating, electrostatic spray coating or fluidized coating.

The coated film so prepared is baked by a conventional method to give a cured film having superior appearance represented by superior smoothness, and outstanding weatherability. The composition can be used on automotive parts, appliances, aluminum profiles, garden and lawn equipment, light fixtures, exterior metal pieces and the like.

The following examples are provided to illustrate the present invention, and should not be construed as limiting thereof. In these examples, all parts and percentages are by weight, unless otherwise noted.

EXAMPLES

A powder coating composition was formulated as follows:

Polyester Resin I

A mixture of 4325 parts of neopentyl glycol and 432 parts of deionized water was heated to 80° C. 6180 parts of terephthalic acid, 344 parts of adipic acid. 7 parts of butyl stannoic acid and 7 parts of triphenylphosphite were added and the mixture was heated to 240° C. over the coarse of 6 hours. It was maintained at this temperature to give a polyester resin (1) having an acid number of 14, a hydroxyl number of 14 and a cone and plate viscosity of 8.5 Pa s.

Polyester Resin II

A mixture of 4027 parts of neopentyl glycol, 158 parts of ethylene glycol and 403 parts of deionized water was heated to 80° C. 5000 parts of terephthalic acid, 1000 parts of isophthalic acid, 350 parts of adipic acid, 7 parts of butyl stannoic acid and 7 parts of triphenylphosphite were added and the mixture was heated to 240° C. over the coarse of 6 hours. It was maintained at this temperature to give a polyester resin (II) having an acid number of 14, a hydroxyl number of 23 and a cone and plate viscosity of 5.0 Pas.

Powder Coating Preparation

The premix was made in a "shake and bake" style for one minute. The paints were extruded twice on an OMC twin screw extruder with a screw speed of 400 rpm. The temperatures were 60° C. in zone 1 and 125° C. in zone 2. The paints were ground with a Retsch mill, rotating at 14,000 rpm. The powders were applied with a Gema corona gun at a voltage of 50 kV on a Q-steel panel QD 36. The baking schedule for the powder paints was 20 minutes at 200° C.

TABLE 1

| Material (parts) | A | B | C | D | E | F | G |
|---|---|---|---|---|---|---|---|
| Polyester resin (I) | 533 | 558 | 568 | 558 | 559 | — | 558 |
| Polyester resin (II) | — | — | — | — | — | 538 | — |
| Vestagon EPBF 1310[1] | 60 | 38 | 30 | — | 38 | 58 | 30 |
| Crelan VP LS 2147[2] | — | — | — | 38 | — | — | — |
| Primid QM-1260[3] | 17 | 14 | 12 | 14 | — | 14 | — |
| Primid XL 552[4] | — | — | — | — | 13 | — | — |
| Araldite PT 910[5] | — | — | — | — | — | — | 22 |
| Kronos 2160[6] | 325 | 325 | 325 | 325 | 325 | 325 | 325 |
| Blanc fixe micro[7] | 50 | 50 | 50 | 50 | 50 | 50 | 50 |
| Benzoin[8] | 4 | 4 | 4 | 4 | 4 | 4 | 4 |
| Fluidep WF 640[9] | 11 | 11 | 11 | 11 | 11 | 11 | 11 |
| Properties | | | | | | | |
| Gloss (60°) | 90 | 92 | 88 | 92 | 90 | 90 | 93 |
| Direct Impact [cm kg] | 100 | 100 | 100 | 100 | 100 | 100 | 100 |
| Reverse Impact [cm kg] | 100 | 100 | 100 | 100 | 100 | 100 | 100 |
| Erichsen Indentation [mm] | >9 | >9 | >9 | >9 | >9 | >9 | >9 |
| QUV B 313 Accelerated weathering [h]* | 510 | 480 | 480 | 480 | 400 | 480 | 480 |

[1]Uretdione supplied by Degussa-Huels
[2]Uretdione supplied by BAYER
[3]Beta-Hydroxylalkylamide supplied by EMS
[4]Beta-Hydroxylalkylamide supplied by EMS
[5]Aromatic glycidyl compound supplied by Ciba
[6]Titanium dioxide supplied by Kronos
[7]Blanc fixe supplied by Sachtleben
[8]Degassing agent supplied by Prochema
[9]Flow agent supplied by Comiel Reagens
*hours at which the initial gloss is reduced by 50%

In the specification and examples, there have been disclosed preferred embodiments of the invention. Although specific terms are employed in these examples, they are used in a generic and descriptive sense only and not for the purpose of limitation.

That which is claimed is:

1. A powder coating composition comprising
   (a) a polyester resin having hydroxyl and carboxyl groups;
   (b) a curing agent for the carboxyl groups of the polyester resin, said curing agent being selected from the group consisting of a beta-hydroxy-alkylamide and an aromatic compound having glycidyl groups; and
   (c) an uretdione hardener comprising self-blocked uretdione groups containing polyisocyanates which reacts with the hydroxyl groups of the polyester resin.

2. The powder coating composition of claim 1, wherein said composition is free of blocking agents.

3. An article coated with the polymer coating composition of claim 1.

4. The powder coating composition of claim 1, wherein the polyester resin has a hydroxyl value of about 5 to 100 mg KOH/g and an acid value of about 5 to 100 mg KOH/g.

5. The powder coating composition of claim 1 further comprising a flow control agent.

6. A powder coating composition comprising:
   (a) about 70 to 97 percent by weight of a polyester resin having hydroxyl and carboxyl groups;
   (b) about 0.5 to 10 percent by weight of a curing agent for the carboxyl groups of the polyester resin, said curing agent being selected from the group consisting of a beta-hydroxy-alkylamide and an aromatic compound having glycidyl groups; and
   (c) about 1 to 20 percent by weight of an uretdione hardener comprising self-blocked uretdione groups containing polyisocyanates which reacts with the hydroxyl groups of the polyester resin.

7. The powder coating composition of claim 6, wherein said composition is free of blocking agents.

8. An article coated with the polymer coating composition of claim 6.

9. The powder coating composition of claim 6, wherein the polyester resin has a hydroxyl value of about 5 to 100 mg KOH/g and an acid value of about 5 to 100 mg KOH/g.

10. The powder coating composition of claim 6, further comprising a flow control agent.

11. A method of coating an article to provide improved resistance to degradation, the method comprising applying a powder coating composition comprising:
   (a) a polyester resin having hydroxyl and carboxyl groups;
   (b) a curing agent for the carboxyl groups of the polyester resin, said curing agent being selected from the group consisting of a beta-hydroxy-alkylamide and an aromatic compound having glycidyl groups; and
   (c) an uretdione hardener comprising self-blocked uretdione groups containing polyisocyanates which reacts with the hydroxyl groups of the polyester resin.

12. The method of claim 11, wherein said composition is free of blocking agents.

13. An article coated using the method of claim 11.

14. The method of claim 11, wherein the curing agent for the carboxyl groups is an aromatic compound containing glycidyl groups.

15. The method of claim 11, wherein the polyester resin has a hydroxyl value of about 5 to 100 mg KOH/g and acid value of about 5 to 100 mg KOH/g.

16. The method of claim 11 further comprising a flow control agent.

* * * * *

UNITED STATES PATENT AND TRADEMARK OFFICE
CERTIFICATE OF CORRECTION

PATENT NO. : 6,599,992 B1
DATED : July 29, 2003
INVENTOR(S) : Brunmair et al.

It is certified that error appears in the above-identified patent and that said Letters Patent is hereby corrected as shown below:

Title page,
Item [75], Inventors, the city for "Brunmair" and "Kaiser" should be -- Wien, Austria. --.
Insert Item -- [74] *Attorney, Agent, or Firm* — Myers Bigel Sibley & Sajovec, PA --

Signed and Sealed this

Twenty-eighth Day of December, 2004

JON W. DUDAS
*Director of the United States Patent and Trademark Office*